United States Patent
Merrill et al.

(10) Patent No.: US 6,452,633 B1
(45) Date of Patent: Sep. 17, 2002

(54) EXPOSURE CONTROL IN ELECTRONIC CAMERAS BY DETECTING OVERFLOW FROM ACTIVE PIXELS

(75) Inventors: Richard B. Merrill, Woodside; Carver A. Mead, Cupertino; Richard F. Lyon, Los Altos, all of CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/031,333

(22) Filed: Feb. 26, 1998

(51) Int. Cl.[7] .......................... H01L 27/148; H04N 3/14
(52) U.S. Cl. ...................... 348/302; 348/294; 257/223
(58) Field of Search ................................ 348/302, 308, 348/294, 296, 297, 298, 299, 241, 243, 221, 250, 362; 250/208.1; 257/223, 290–294, 229, 230

(56) References Cited

U.S. PATENT DOCUMENTS

| | | | |
|---|---|---|---|
| 3,866,067 A | 2/1975 | Amelio | 307/311 |
| 3,934,161 A | 1/1976 | Caywood | 307/311 |
| 4,363,963 A | 12/1982 | Ando | 250/211 |
| 4,499,529 A | 2/1985 | Figueroa | 362/283 |
| 4,573,077 A | 2/1986 | Imai | 358/212 |
| 4,626,915 A | 12/1986 | Takatsu | 358/213 |
| 4,742,238 A | 5/1988 | Sato | 250/578 |
| 4,839,735 A | 6/1989 | Kyomasu et al. | 358/213.31 |
| 4,843,474 A | 6/1989 | Suzuki | 358/213.19 |
| 4,901,129 A | 2/1990 | Hynecek | 357/30 |
| 4,908,651 A | 3/1990 | Fujino et al. | 354/434 |
| 5,038,214 A | 8/1991 | Miida | 358/213.11 |
| 5,117,292 A | 5/1992 | Matsunaga | 358/213.19 |
| 5,227,887 A | 7/1993 | Dohi et al. | 358/213.27 |
| 5,276,520 A * | 1/1994 | Hawkins et al. | 257/223 |
| 5,276,521 A | 1/1994 | Mori | 358/213.31 |
| 5,335,015 A | 8/1994 | Cooper et al. | 348/302 |
| 5,434,620 A | 7/1995 | Higuchi et al. | 348/308 |

(List continued on next page.)

FOREIGN PATENT DOCUMENTS

| | | | |
|---|---|---|---|
| EP | 0 466 929 A1 | 1/1992 | |
| EP | 0777379 | 6/1997 | H04N/3/15 |
| JP | 54-108628 | 8/1979 | G03B/7/20 |
| JP | 58-83824 | 5/1983 | G03B/7/20 |
| JP | 59-42527 | 3/1984 | G03B/17/14 |
| JP | 59-152424 | 8/1984 | G03B/7/20 |
| JP | 60-23841 | 2/1985 | G03B/17/14 |
| JP | 60-53912 | 3/1985 | G02B/7/11 |
| JP | 62143571 | 6/1987 | |
| JP | 01103378 | 4/1989 | |

OTHER PUBLICATIONS

"Color sensitive photodetectors in standard CMOS and BiCMOS technologies" Mohamed Ben Chouikha, et al. pp 108–120, including cover sheet, SPIE vol. 2950, 0-8194-2354 8/96.

(List continued on next page.)

Primary Examiner—Wendy R. Garber
Assistant Examiner—Rashawn N. Tillery
(74) Attorney, Agent, or Firm—Sierra Patent Group, Ltd.

(57) ABSTRACT

A method for controlling the exposure of an active pixel array electronic still camera includes the steps of: integrating photocurrent in each pixel during an integration time period; collecting overflow charge from all pixels in the array during the integration time period; developing an overflow signal as a function of the overflow charge; and terminating the integration time period when the overflow signal exceeds a preset threshold level selected to represent a desired reference exposure level. Apparatus for performing the method of the present invention includes circuitry for integrating photocurrent in each pixel during a integration time period; circuitry for diverting and detecting overflow charge from all pixels in the array during the integration time period; circuitry for developing an overflow signal as a function of the overflow charge; and circuitry for terminating said integration time period when the overflow signal exceeds a preset threshold level selected to represent a desired reference exposure level.

20 Claims, 10 Drawing Sheets

U.S. PATENT DOCUMENTS

| | | | | |
|---|---|---|---|---|
| 5,502,538 A | * | 3/1996 | Ogasawara | 348/297 |
| 5,625,210 A | | 4/1997 | Lee et al. | 257/292 |
| 5,631,704 A | | 5/1997 | Dickinson et al. | 348/308 |
| 5,712,682 A | | 1/1998 | Hannah | 348/255 |
| 5,729,287 A | * | 3/1998 | Morimoto | 348/241 |
| 5,777,675 A | * | 7/1998 | Miida et al. | 348/221 |
| 6,046,444 A | * | 4/2000 | Afghahi | 250/208.1 |

OTHER PUBLICATIONS

"Low Cost Approach to Realize Novel Detectors for Color Recognition" D. Knipp, et al. pp 350–353.

Chye Huat Aw, et al. "A 128×128–Pixel Standard CMOS Image Sensor with Electronic Shutter" IEEE International Solid State Circuits Conference vol. 39 pp 180–181, 440 Feb. 1996.

R.M. Guidash, et al. "A 0.6 um CMOS Pinned Photodiode Color Imager Technology" IEDM pp. 927–929 1997.

S. Decker et al. "A 256×256 CMOS Imaging Array with Wide Dynamic Range Pixels and Column–Parallel Digital Output" IEEE International Solid–State Circuits Conference pp. 176–177 1998.

Tatsuo Nomoto, et al. "FA 11.4: A 4M–Pixel Image Sensor with Block and step Access Capability" IEEE International pp. 186–187 1997, plus four pages of slides.

Hon–Sum Philip Wong, et al. CMOS Active Pixel Image Sensors Fabricated Using a 1.8–V, 0.25–um CMOS Technology pp 889–894 IEEE Transactions on Electron Devices vol. 45 No. 4 Apr. 1998.

R. Panicacci, et al., 1/4–Inch CMOS Active Pixel Sensor- with Smart On–Chip Function and Full Digital Interface, Hot Chips IX, Stanford CA, Aug. 1997, pp: 41–54.

* cited by examiner

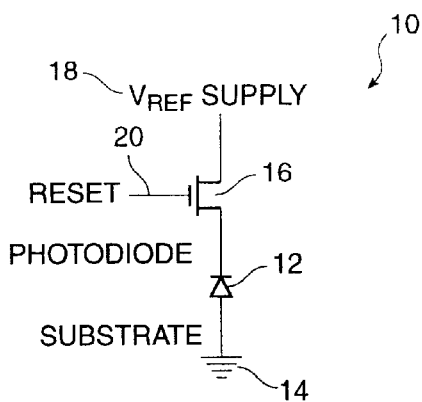
FIG. 1
(PRIOR ART)
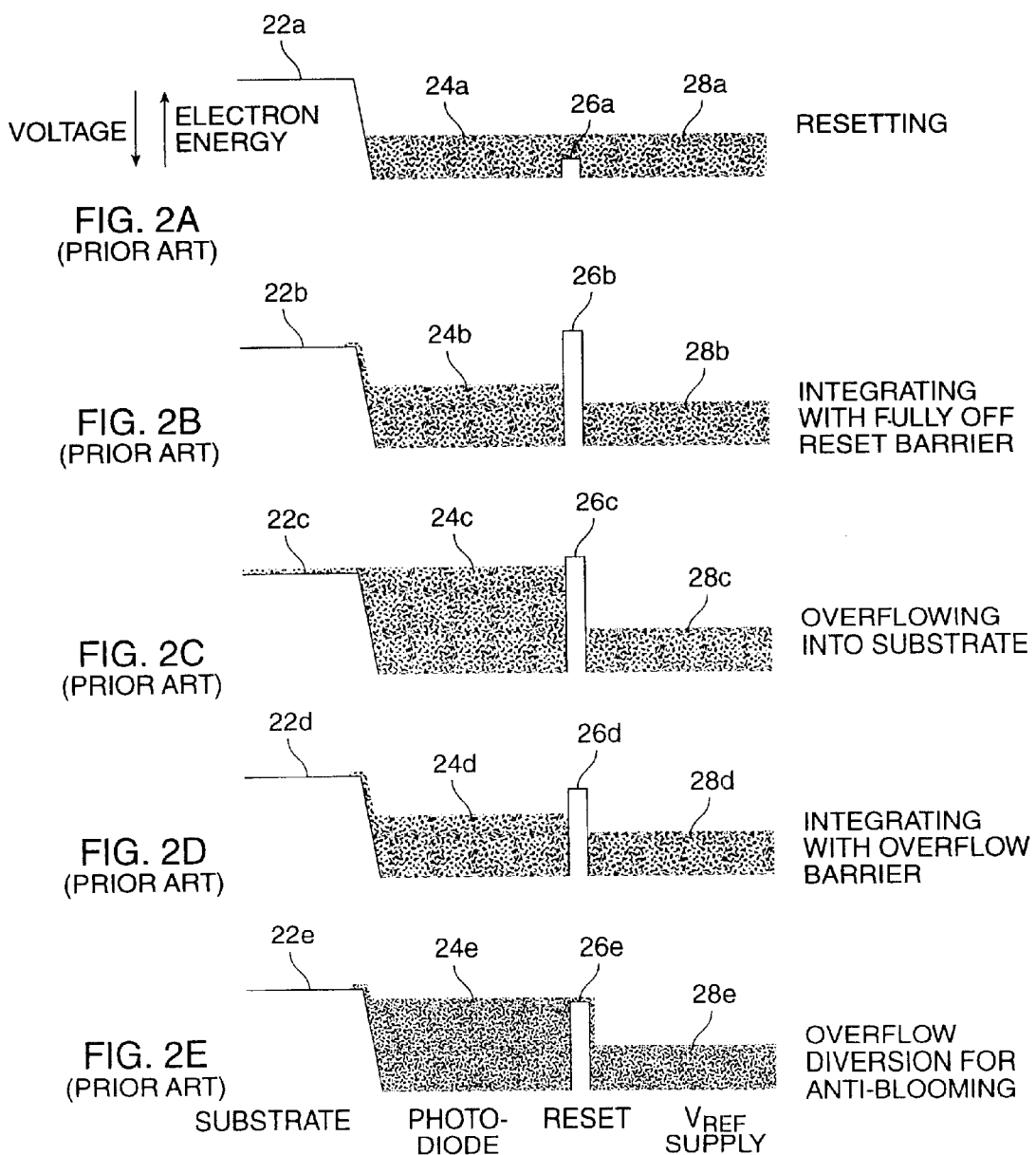
FIG. 2A (PRIOR ART) — RESETTING
FIG. 2B (PRIOR ART) — INTEGRATING WITH FULLY OFF RESET BARRIER
FIG. 2C (PRIOR ART) — OVERFLOWING INTO SUBSTRATE
FIG. 2D (PRIOR ART) — INTEGRATING WITH OVERFLOW BARRIER
FIG. 2E (PRIOR ART) — OVERFLOW DIVERSION FOR ANTI-BLOOMING

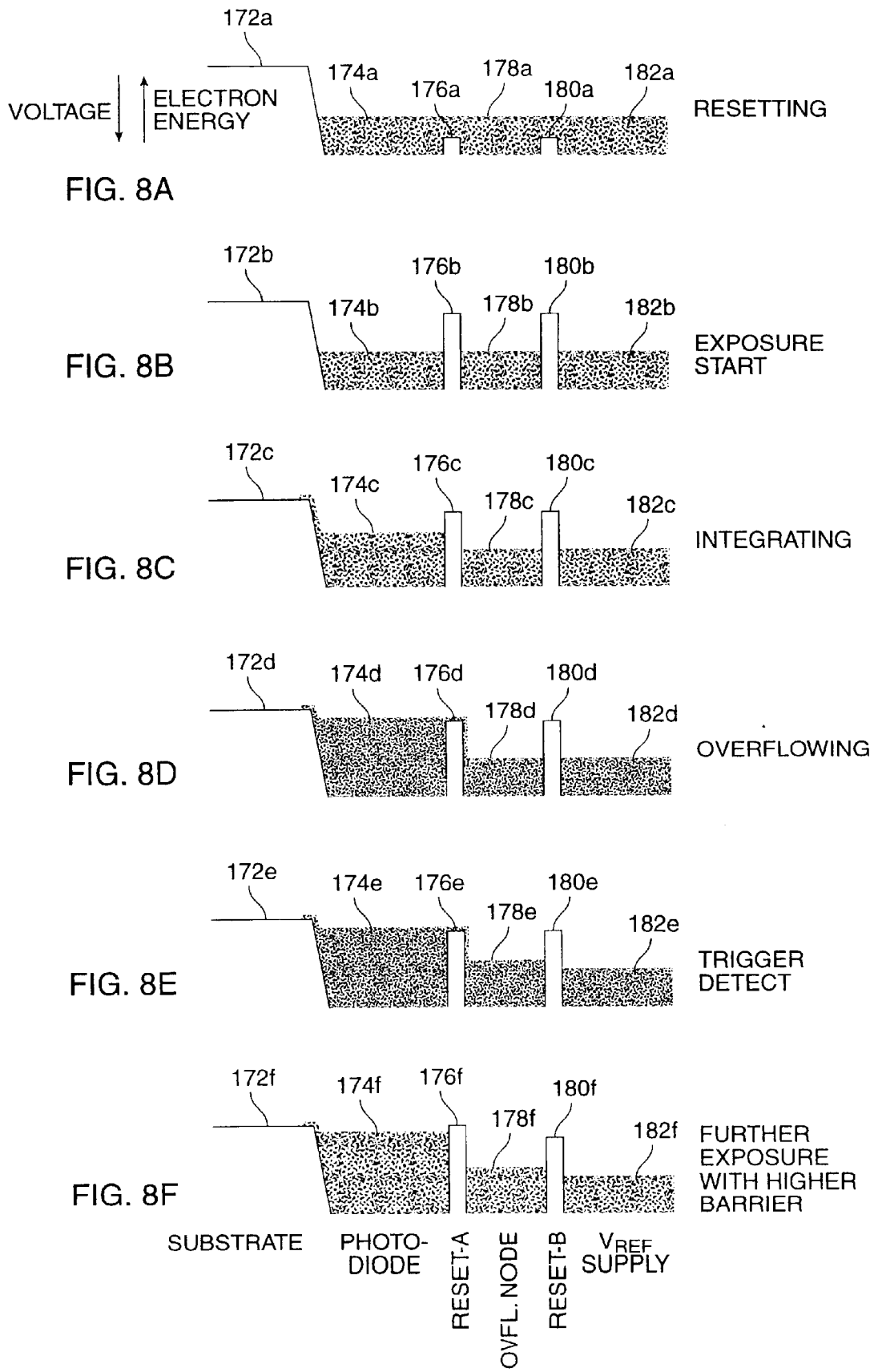

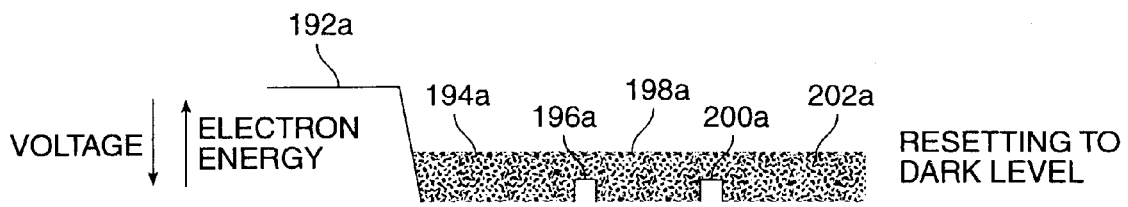
FIG. 10A  RESETTING TO DARK LEVEL
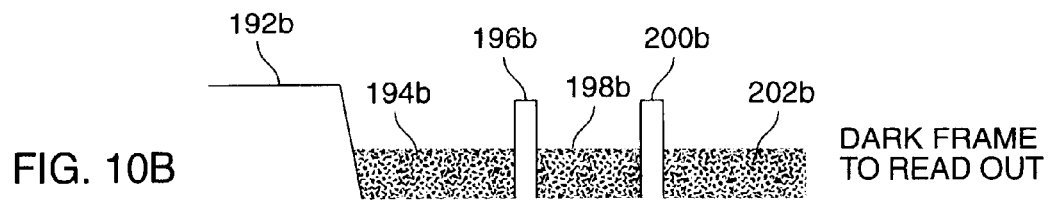
FIG. 10B  DARK FRAME TO READ OUT
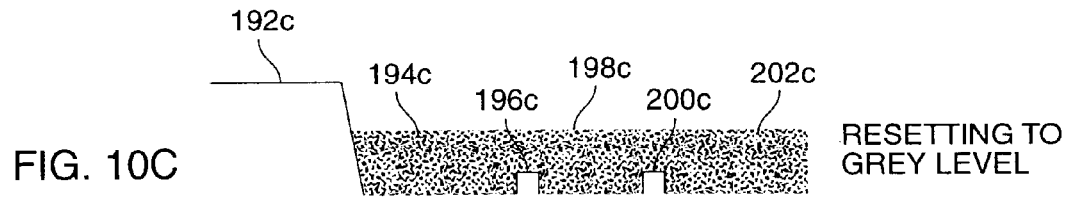
FIG. 10C  RESETTING TO GREY LEVEL
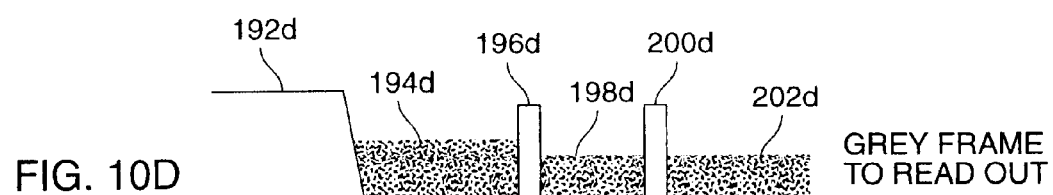
FIG. 10D  GREY FRAME TO READ OUT

EXPOSURE CONTROL IN ELECTRONIC CAMERAS BY DETECTING OVERFLOW FROM ACTIVE PIXELS

BACKGROUND OF THE INVENTION

1. Field of the Invention

The present invention relates to electronic cameras employing solid state pixel sensor arrays. More particularly, the present invention relates to circuits and techniques for exposure control of such cameras and to exposure control of such cameras by means of overflow detection in arrays of active pixels.

2. The Prior Art

Prior art exposure control techniques known to the inventors that use the actual image sensors during the actual exposure interval are of two types. Some prior art techniques integrate the total photocurrent by a common back-side electrode (anode) of a group of photodiodes—i.e., they integrate the substrate current to get an average light reading on the whole array. Other prior art techniques use nondestructive readout to sample selected pixels during the exposure interval, looking for an indication that some pixels are reaching a full-scale exposure.

The first technique is tricky and difficult to implement, since the photocurrents are small and the substrate is large and noisy. In addition, it responds strictly to the average light level across the image plane rather than to those pixels that are reaching a full-scale charge accumulation. The second technique requires a sequential polling, so is limited to either a very slow operation or to sensing only a very small subset of the pixels. The second technique is therefore not good for detecting the exact time when a small percentage of pixels are reaching a full-scale exposure.

Other prior art techniques for exposure control typically measure the light either at a different time, e.g. just before the actual exposure, or with a different sensor device that needs to be calibrated relative to the sensor that is picking up the actual image. Such techniques typically sample the image plane at selected fixed points rather than adapting to the lighting conditions of the entire image.

One such prior art technique uses an imager first to estimate a light level and thereby to calculate an optimum exposure duration for a second cycle of the imager. This technique is obviously not as fast, and particularly is unsuited to controlling the exposure time rapidly during a dynamic lighting event, provided for example from a strobe flash.

Another such prior art technique employs a separate overall light sensor to measure an average light level and to react to a sufficient quantity of light by closing a shutter or quenching a strobe flash. Mechanical shutters and non-frame-storage electronic sensors cannot be shuttered rapidly enough to use this technique during a flash, which is why the detector is sometimes used to turn off the light source instead of closing a shutter. These techniques require an awkward coordination between the camera, the light sensor, and the light source, and do not necessarily track automatically the sensitivity (or film speed) and lens aperture of the camera.

Another type of prior art technique relates to use of an adjustable overflow drain for dynamic range enhancement. These techniques have not been integrated with the use of the overflow current for terminating the exposure time. Variations on this technique employ either a moving overflow barrier or a dual exposure interval to increase dynamic range.

It is therefore an object of the present invention to provide an exposure control technique for an electronic still camera employing a solid state imaging array which overcomes the shortcomings of the prior art.

It is another object of the present invention to provide an exposure control technique for an electronic still camera employing a solid state imaging array which exploits the overflow current produced by overexposed pixels in active pixel arrays.

Yet another object of the present invention is to provide an exposure control technique for an electronic still camera employing a solid state imaging array which may be employed in conjunction with dark-frame-subtraction noise reduction techniques.

Yet another object of the present invention is to provide an exposure control technique for an electronic still camera employing a solid state imaging array which provides enhanced dynamic range through overflow detection in the active pixels.

BRIEF DESCRIPTION OF THE INVENTION

A method according to the present invention for controlling the exposure of an active pixel array for applications such as an electronic still camera includes the steps of: integrating photocurrent in each pixel during an integration time period; collecting overflow charge from all pixels in the array during the integration time period; developing an overflow signal as a function of the overflow charge; and terminating the integration time period when the overflow charge exceeds a threshold level selected to represent a desired reference exposure level.

According to a presently preferred embodiment of the invention, the step of collecting overflow charge from all pixels in the array comprises setting a charge potential barrier at the cathode of a photodiode in each pixel, the potential barrier being lower than the potential at which charge would overflow into the substrate, and the step of developing an overflow signal comprises generating a signal from charge overflowing the potential barrier.

Apparatus according to the present invention for controlling the exposure of an active pixel array includes means for integrating photocurrent in each pixel during a integration time period; means for collecting overflow charge from all pixels in the array during the integration time period; means for developing an overflow signal as a function of the overflow charge; and means for terminating the integration time period when the overflow signal exceeds a preset threshold level.

According to a presently preferred embodiment of the invention, the means for collecting overflow charge from all pixels in the array comprises means for setting a charge potential barrier at the cathode of a photodiode in each pixel, the potential barrier being lower than the potential at which charge would overflow into the substrate, and for collecting charge overflowing the potential barrier. As presently preferred, this function is performed by using the reset transistor in each pixel as a settable charge overflow barrier which is set to a level below (more positive than) the potential at the substrate. In addition, the means for developing an overflow signal comprises means for developing a voltage proportional to the excess charge accumulation at the cathode of the photodiode in all pixels. As presently preferred, this function is performed by developing a voltage proportional to the total charge allowed to flow into the Vref supply from all pixels in the array.

Another aspect of the present invention provides for producing a dark frame for the purpose of canceling out fixed pattern noise. Dark frame subtraction is employed to significantly reduce fixed pattern noise due to variations between pixels. Dark frame capture can easily be implemented electronically with a frame store imager simply by having a very short exposure time, preferably as controlled by the same timing and logic circuits that control automatic exposure. This eliminates the need for a mechanical shutter to perform the dark frame generation, which will save cost and complexity of the camera. A method is provided for obtaining calibration information for the individual pixels. Normally each pixel in an imager is reset to a reference level before an integration cycle begins. After the pixel is reset, photocurrent in the photodiode causes the voltage on its cathode and a storage capacitor to droop, corresponding to the signal. To generate a reference dark frame, the reset switch and the transfer switch connecting the photodiode to the capacitor are clocked in rapid succession so that there is no time for photocurrent to accumulate, generating a reference frame that can be subtracted from the image frame at a later time when both frames have been stored on the host system. The dark frame captures information about readout offset voltages of the individual pixels and an absolute zero-intensity reference per pixel. The dark frame may be captured before or after an actual exposure frame. Gray frames for calibration may similarly be captured by varying the Vref potential during reset.

BRIEF DESCRIPTION OF THE DRAWING FIGURES

FIG. 1 is a simplified schematic diagram of a single prior-art pixel sensor.

FIGS. 2a through 2e are energy diagrams which illustrate the prior-art problem of "blooming" due to charge overflow in the pixel sensor of FIG. 1, and of one prior-art method for dealing with blooming.

Figure 5:
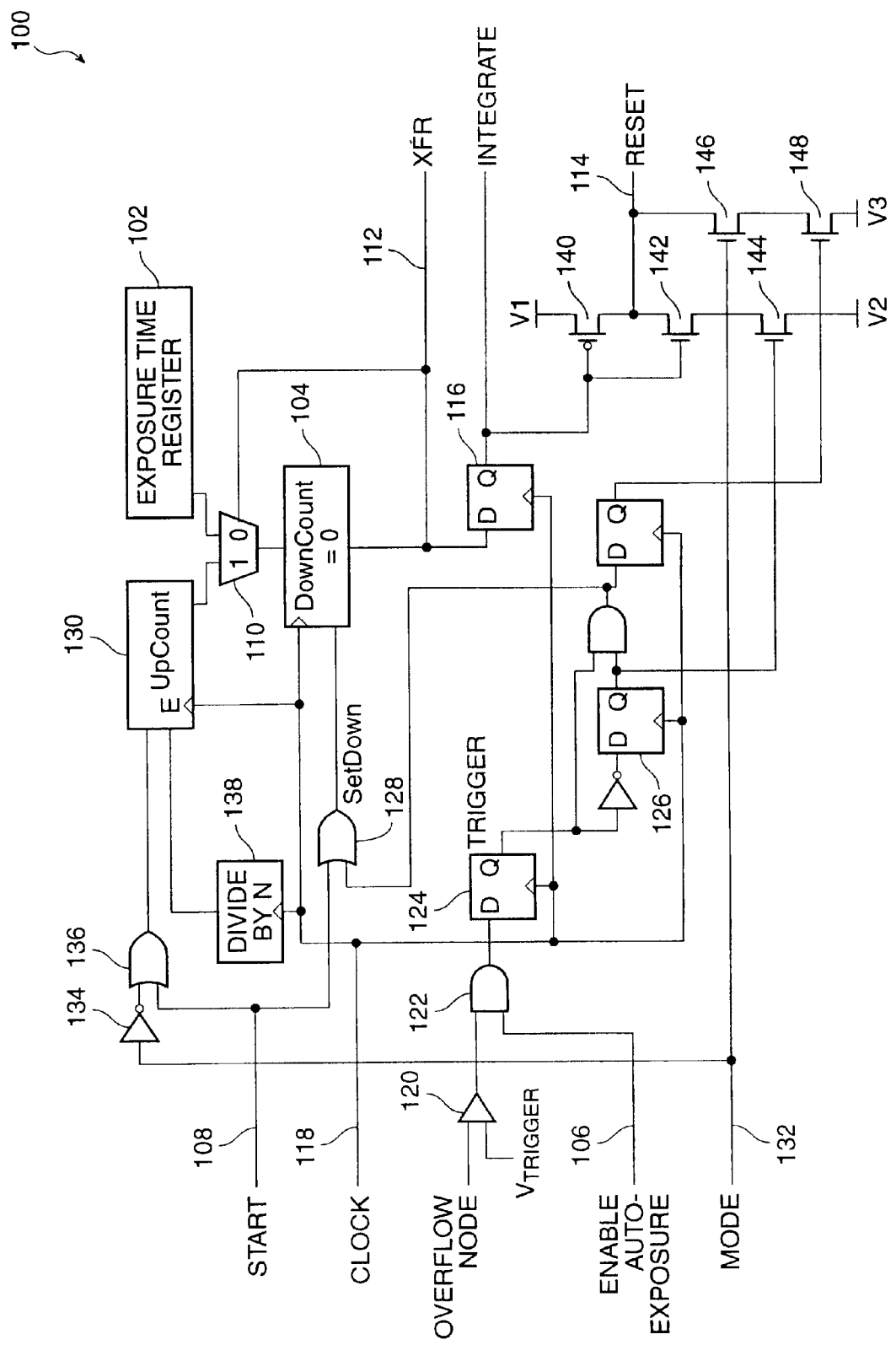
FIG. 5 is a block diagram of another circuit according to the present invention for providing exposure control in active pixel sensor arrays by means of overflow detection in an active-pixel array according to the present invention and additionally for extending the dynamic range of an active pixel imager.
Figure 6A:
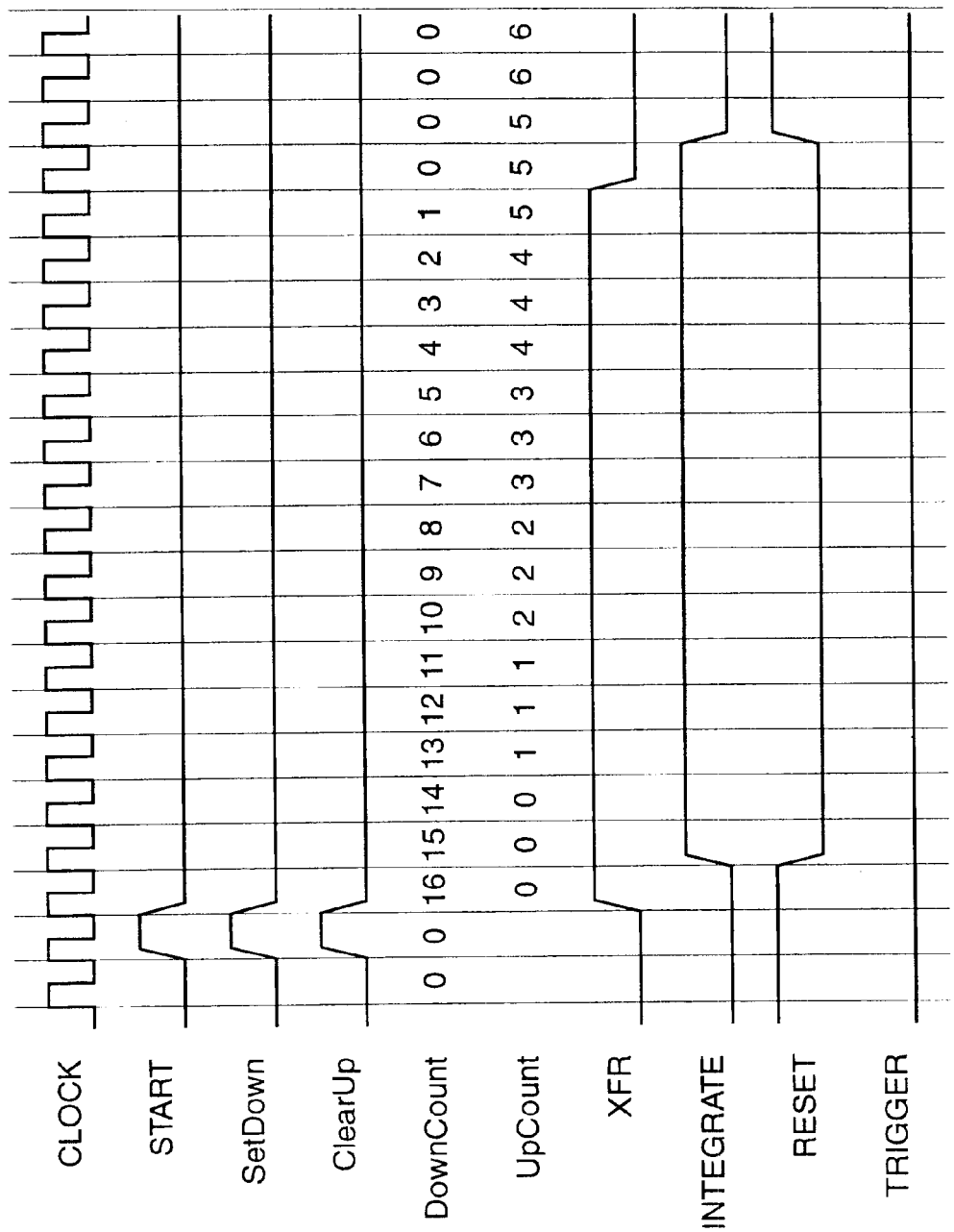
Figure 6B:
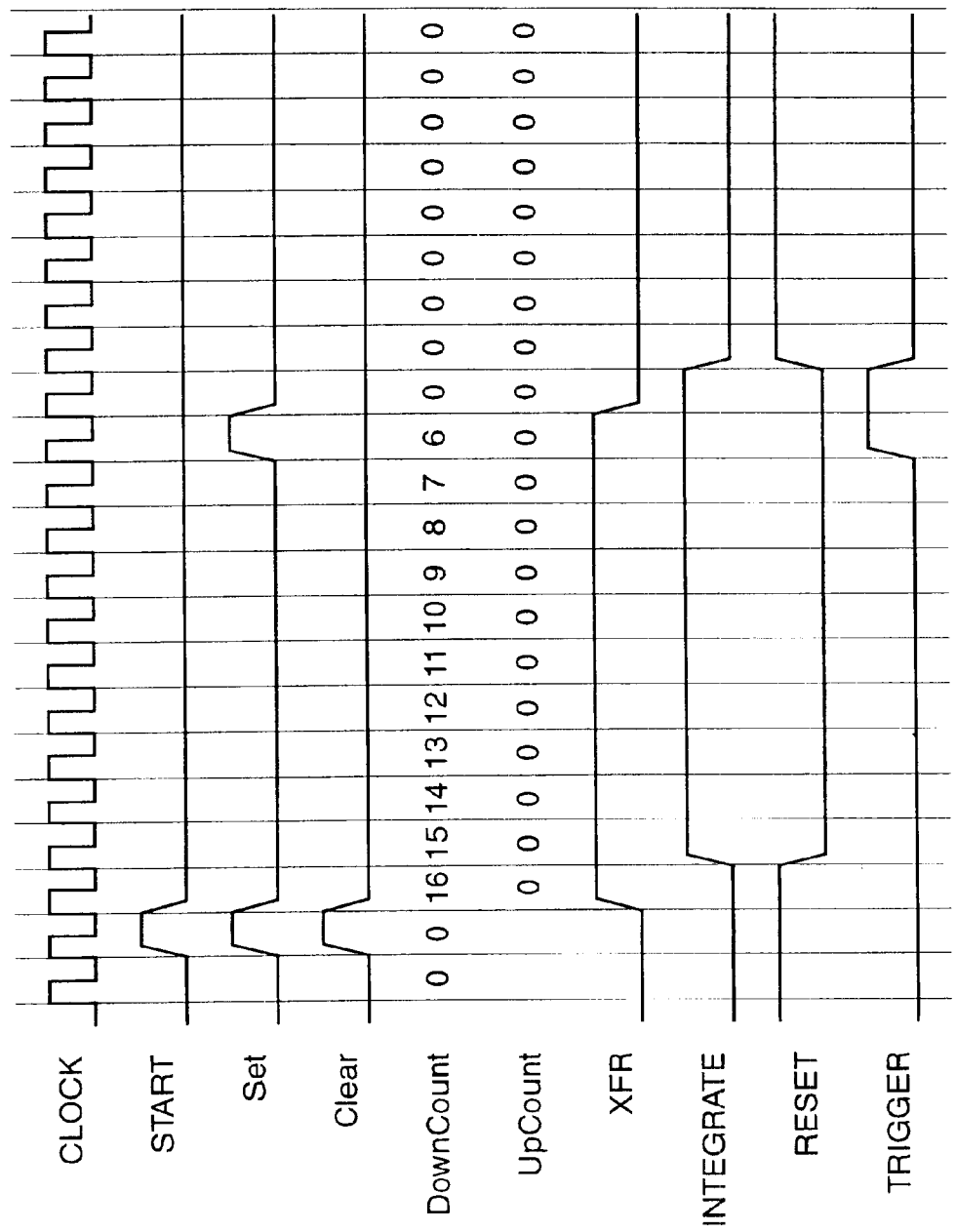
Figure 6C:
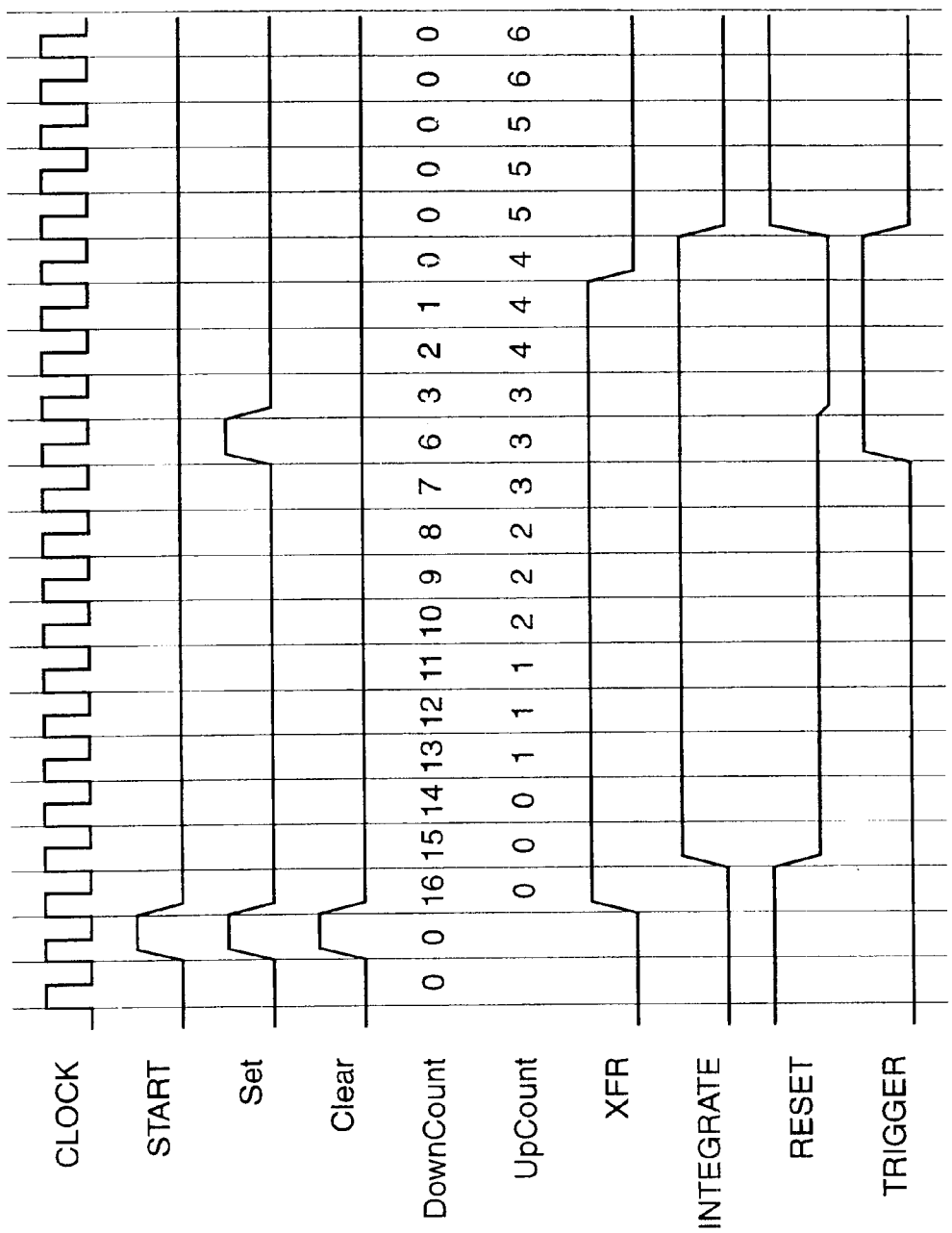

FIGS. 6a, 6b, and 6c are timing diagrams showing the operation of the circuit of FIG. 5 in its different modes.

Figure 7:
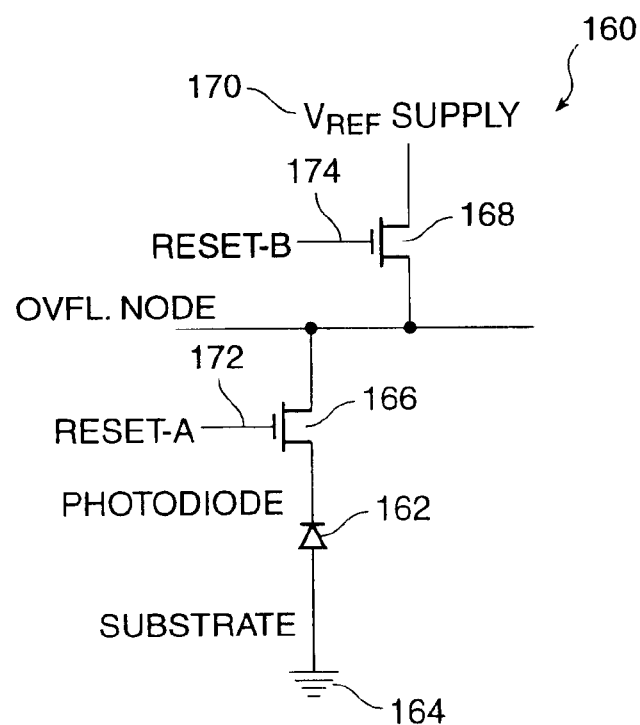

FIG. 7 is a simplified schematic diagram of a single pixel sensor according to the present invention.

FIGS. 8a through 8f are energy diagrams illustrating the adaption of an anti-blooming overflow barrier for use as an autoexposure detector according to the present invention.

Figure 9:
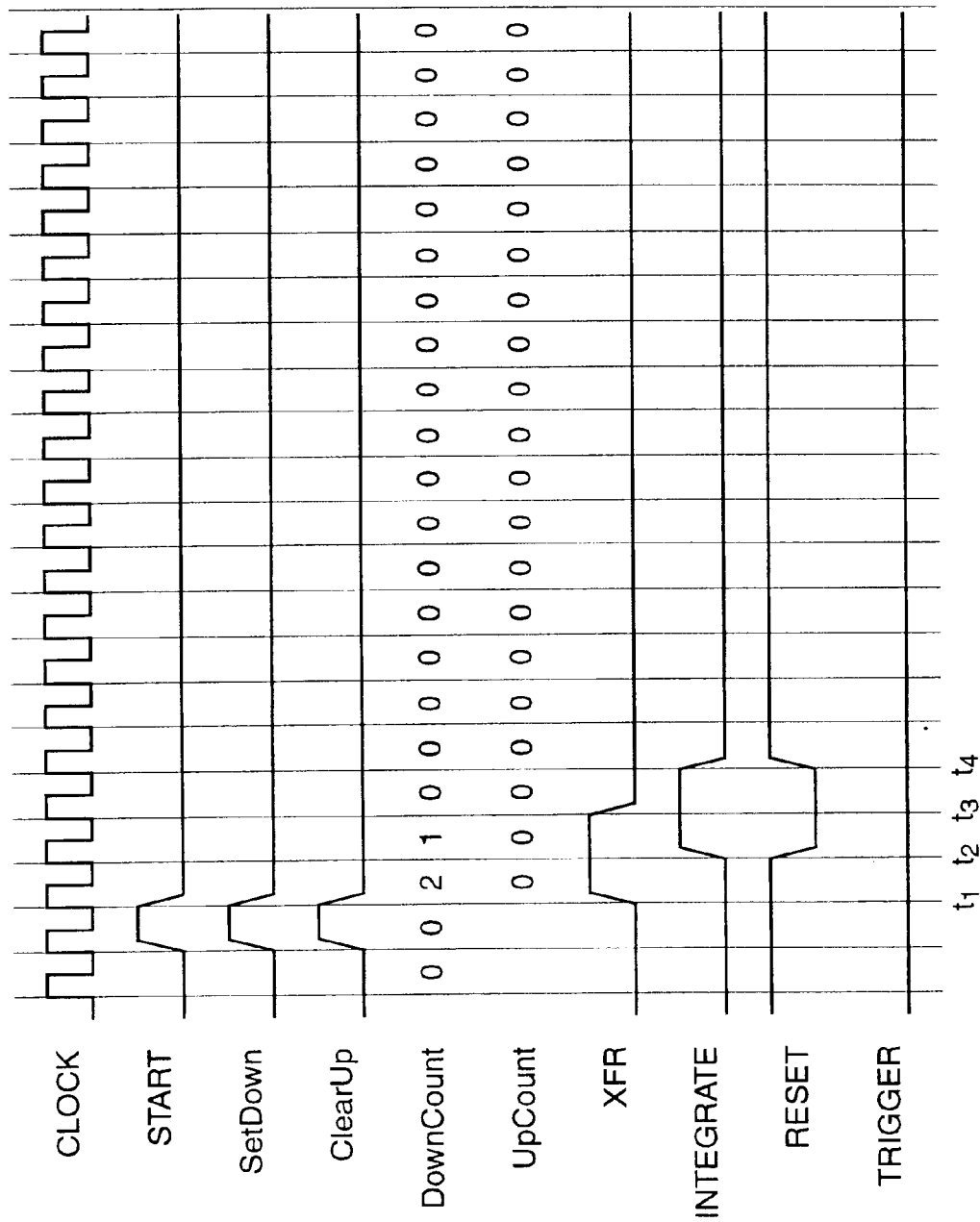

FIG. 9 is a timing diagram showing the transfer, reset, and integrate output waveforms of the circuit of FIG. 5.

FIGS. 10a through 10d are energy diagrams illustrating the dark frame and gray frame calibration feature of the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Frame-storage imaging arrays according to the present invention have the ability to begin and end an exposure interval very quickly under completely electronic control via timing logic signals. One aspect of the present invention exploits that capability by providing methods and circuits for detecting when the exposure is sufficient, and for automatically terminating the exposure interval very precisely. The present invention thereby responds to the actual light being received during the exposure interval, as detected by the actual detectors. This is believed to be an improvement over measuring the light with a separate detector or at a separate time.

The presently preferred embodiment of the invention takes advantage of the fact that the active pixel includes a reset transistor and further employs that transistor as an anti-blooming or overflow gutter, and senses the overflow amount as an indication of when some pixels have reached a full-scale exposure.

In addition, the present invention adds the use of essentially zero exposure time to do a dark-level calibration, and other innovations. The fact that the frame-storage sensor array can do precisely controlled exposure times means that it can also do a vanishingly small exposure time with otherwise normal timing, as a way to obtain an image representative of the dark-state offsets of the amplifiers and readout circuits. This dark frame is one part of an automatic calibration scheme of the present invention. A second part of the automatic calibration scheme is one or more "gray" frames: a voltage level is established in each pixel sensor through the same transistor used for reset, overflow, and exposure detection, so that the offsets of the amplifier and readout circuitry can be read out as an image, at one or more levels, to be used in correcting images made earlier or later with the same camera.

Because of the fast shutter capability, it is possible to perform these calibration image measurements even without darkening the image on the sensor array. These calibration images are not the same as prior art techniques that integrate a dark current over a time interval—those techniques can also be used, to further remove leakage or dark current artifacts, but they require actually darkening the image on the sensor array.

The use of the overflow signal in the present invention means that the exposure control is paying particular attention to the highlights of an image, or those parts that are limiting with respect to a charge-integration type of image sensor. Essentially, the overflow/reset transistor acts as an expansive nonlinearity, so that when the responses are added, the total response preferentially weights the peaks, as opposed to the average, of the light levels in the imaging area. This use of a nonlinearity in an averaging exposure control system is believed to be in itself novel.

An important surprising advantage comes from the combination of the rapid automatic exposure sensing with the frame-storage nature of the image sensor array. Since the exposure time at each sensor pixel can be terminated immediately and globally across the imager array by a transition on the XFR line, independent of any readout time interval, the shutter can be operated rapidly enough to cut off the exposure accurately even during a rapid dynamic lighting event such as a strobe flash. Furthermore, the mechanism for so doing is the same mechanism, with no control differences, as used without a flash; so the camera can give a correct exposure without being set to different modes for different lighting conditions.

Referring first to FIGS. 1 and 2a through 2e, a simplified schematic diagram of a single pixel sensor and energy diagrams describing its behavior, respectively, are provided to illustrate the prior-art problem of "blooming" due to charge overflow in pixel sensors and of one prior-art method for dealing with blooming. The prior-art pixel sensor 10 of FIG. 1 includes a photodiode 12, having its anode formed in a semiconductor substrate (shown as ground symbol 14), and its cathode connected to the source of a reset transistor 16. The drain of the reset transistor 16 is connected to a reference voltage supply Vref (shown at reference numeral 18), and its gate is connected to a reset control line 20.

FIGS. 2a through 2e are energy diagrams which illustrate the potential energy of electrons at different points in the circuit of FIG. 1. In each of FIGS. 2a through 2e, the substrate potential is shown at the left at reference numeral 22, the potential of the photodiode cathode is shown to its right at reference numeral 24, the potential barrier set by the reset transistor is shown to the right of the photodiode cathode at reference numeral 26, and the potential of the Vref supply furthest to the right at reference numeral 28. The reference numerals 22, 24, 26, and 28 will be followed by suffixes a through e to correspond to the figures to which reference is made. The stippling and individual dots in each of the figures illustrate incremental increments of charge. The height of the stippling in 1b each region indicates the potential to which such charge has elevated each region. Those of ordinary skill in the art will recognize that charge units are electrons and thus that higher barriers or levels of charge represent lower voltages.

FIG. 2a illustrates the potential energy conditions which exist during the reset period when the reset transistor 16 is turned on to reset the pixel sensor to Vref. At the point in time illustrated by FIG. 2a, the potential barrier presented by the reset transistor at reference numeral 26a is low and the energy level at the cathode of the photodiode 12 at region 24a is set equal to Vref by the flow of current through reset transistor 16. Thus the potential at the cathode of photodiode 12 at region 24a has been set equal to the level Vref which exists at reference numeral 28a.

FIG. 2b illustrates the potential energy conditions which exist during the early portion of the integration period when the reset transistor 16 is turned off and charge is accumulating at the cathode of photodiode 12 in region 24b. The accumulation of charge raises the voltage at the cathode of photodiode 12 in region 24b because the potential barrier of the reset transistor 16 at reference numeral 26b prevents the charge from flowing through reset transistor 16 to the Vref supply 18 at potential 28b. Photon-generated electrons that are forming in the substrate 22b are shown flowing "downhill" into the region 24b.

FIG. 2c illustrates the potential energy conditions which exist during the later portion of the integration period when the reset transistor 16 is turned off and charge has accumulated at the cathode of photodiode 12 in region 24c to the point where it has raised the potential of the photodiode cathode to a level which allows the accumulated charge to overflow into the substrate at reference numeral 22c since the potential is higher than the substrate potential. The potential barrier of the reset transistor 16 at reference numeral 26c prevents the charge from flowing through reset transistor 16 to the Vref supply 18.

FIGS. 2d and 2e, to which attention is now drawn, illustrate a prior-art solution to the "blooming" problem caused by charge overflow into the substrate. The energy diagram of FIG. 2d illustrates the potential energy conditions which exist during the early portion of the integration period when the reset transistor 16 is turned off and charge is accumulating at the cathode of photodiode 12 in region 24d. Just as in the example of FIG. 2b, the accumulation of charge raises the voltage at the cathode of photodiode 12 in region 24d because the potential barrier of the reset transistor 16 at reference numeral 26d prevents the charge from flowing through reset transistor 16 to the Vref supply 18 at potential 28d.

The energy diagram of FIG. 2e illustrates the potential energy conditions which exist later during the integration period. The reset transistor 16 is still turned off and charge has accumulated at the cathode of photodiode 12. Just as in the example of FIG. 2c, the accumulation of charge continues to raise the voltage at the cathode of photodiode 12 in region 24e. However, because the potential barrier of the reset transistor 16 at reference numeral 26e is set to a potential level lower than that of the substrate at reference numeral 22e, the excess charge overflows into the Vref supply through reset transistor 16 rather than into the substrate 14 as was the case with the arrangement depicted in FIG. 2c. The potential barrier of reset transistor 16 is set by appropriately biasing the gate of reset transistor 16 so that, as the voltage at the source of reset transistor 16 drops with accumulated charge, reset transistor 16 begins to allow current to flow before the potential 24e at the cathode of photodiode 12 reaches the substrate potential 22e.

Figure 3:
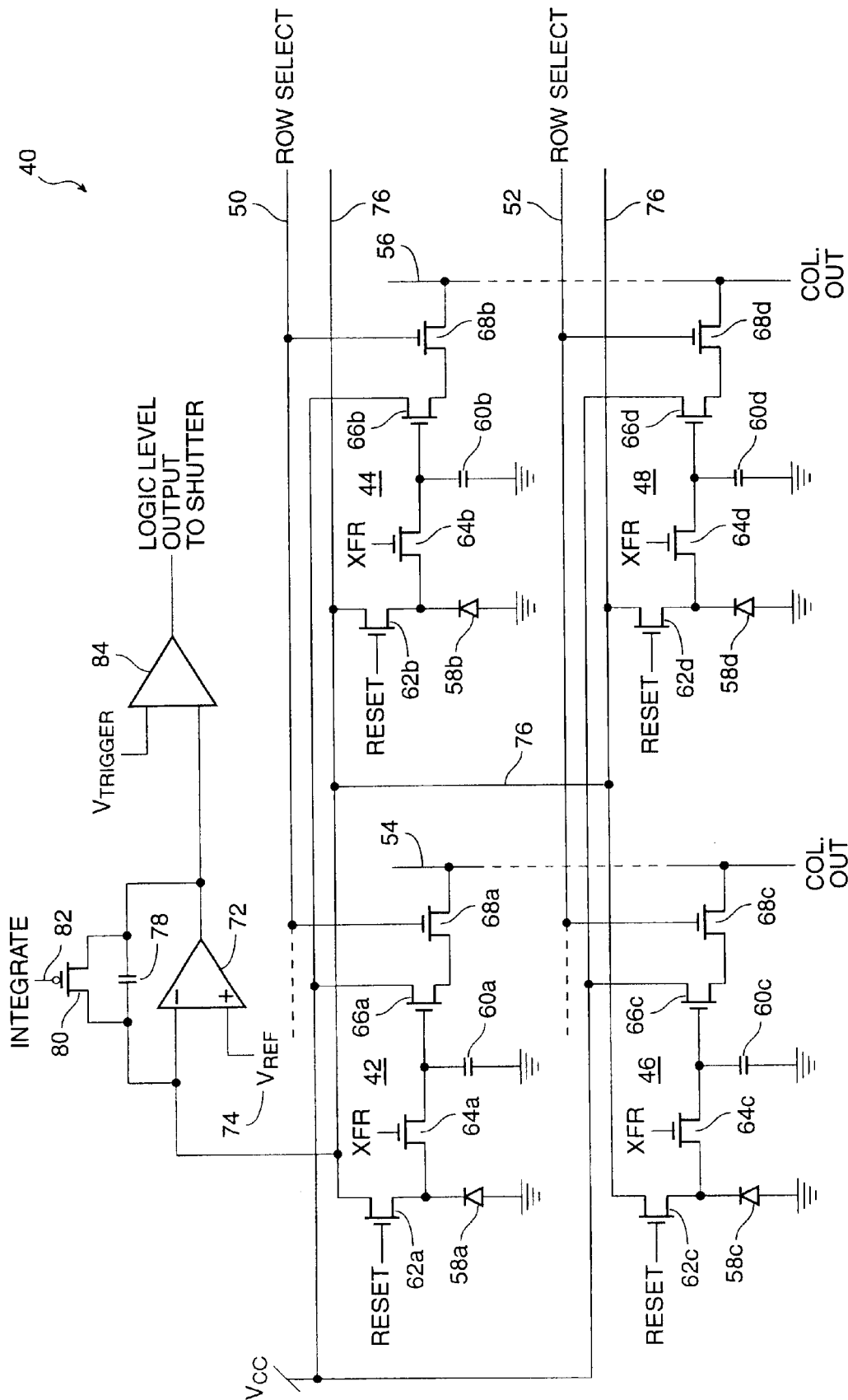
FIG. 3 is a schematic diagram of a circuit according to the present invention for providing exposure control in active pixel sensor arrays by means of overflow detection in an active-pixel array according to the present invention.

Referring now to FIG. 3, a circuit 40 which provides one solution to the problem of determining the correct exposure interval for active pixel arrays for use in application such as electronic still cameras is described. Four illustrative pixels of an imaging array, indicated generally at reference numerals 42, 44, 46, and 48, are depicted in FIG. 3. The four illustrative pixels 42, 44, 46, and 48 are depicted in adjacent rows and columns. A first row containing pixels 42 and 44 is associated with row-select line 50 and a second row containing pixels 46 and 48 is associated with row-select line 52. A first column containing pixels 42 and 46 is associated with column-output line 54 and a second column containing pixels 44 and 48 is associated with column-output line 56.

Persons of ordinary skill in the art will recognize that, while four illustrative storage pixels are shown in FIG. 3, a real imager array according to the present invention would consist of thousands or millions of pixels. Such skilled persons would also recognize that the concept disclosed with respect to FIG. 3 would work as well for active pixels without the storage elements 60a through 60d and transfer switches 64a through 64d shown in the pixels of FIG. 3.

Each of pixels 42, 44, 46, and 48 is identical and the circuit elements of each pixel will be designated by identical reference numerals each having a suffix identifying the pixel with which it is associated. The circuit elements of pixels 42, 44, 46, and 48 will be designated by suffix letters a, b, c, and d, respectively, in FIG. 3.

According to the presently preferred embodiment of the invention, each of pixels 42, 44, 46, and 48 comprises a photodiode 58, a storage capacitor 60, a reset switch 62, a transfer switch 64, an output amplifier 66, and a select switch 68. According to the presently-preferred embodiment of the invention, each of switches 62, 64, and 68 comprises an N-Channel MOS transistor, although persons of ordinary skill in the art will be readily able to fabricate other embodiments in light of the teachings herein.

Operation of each of pixels 42, 44, 46, and 48 is fully described in co-pending application entitled "INTRA-PIXEL FRAME STORAGE ELEMENT, ARRAY, AND ELECTRONIC SHUTTER METHOD SUITABLE FOR ELECTRONIC STILL CAMERA APPLICATIONS", Ser. No. 08/969,383, filed Nov. 13, 1997, and assigned to the same assignee as the present invention. Briefly, each pixel is first reset by turning on both its reset switch 62 and its transfer switch 64. Then the reset switches 62 are turned off so that integration of photocurrent from photodiode 58 can begin.

When transfer switch 64 is turned on, the capacitance of the storage capacitor 60 adds to the capacitance of the photodiode 58 during integration, thereby increasing the charge capacity and therefore dynamic range of the storage-pixel sensor. This also reduces variation in the pixel output due to capacitance fluctuations since the gate oxide capacitance from which storage capacitor 60 is formed is better controlled than the junction capacitance of the photodiode 58.

The present invention relies on overflow detection. At long exposure times, and assuming that the reset switch 62 is fully off, the voltages at the cathodes in the photodiodes of pixels receiving high light levels become so low that the cathodes no longer attract photo-generated electrons from the anode. These electrons tend to drift into the substrate. According to the present invention, the reset transistor 62 of each pixel in the array is employed to perform overflow detection by using it as an overflow barrier. The barrier of each reset transistor in the array is set to a potential lower than that of the substrate so that excess charge above a level set by the gate voltage of the reset transistor 62 is passed through each reset transistor to a node from which total charge passed from all pixels can be sensed and an overflow signal developed therefrom.

The overflow detection circuit comprises an operational amplifier 72, having its non-inverting input connected to a reference voltage Vref (indicated at reference numeral 74) and its inverting input connected to reset line 76, to which the drains of all reset transistors 62 in the array are connected. A feedback circuit from the output of amplifier 72 to its inverting input comprises a capacitor 78, shunted by P-Channel MOS transistor 80. The gate of P-Channel MOS transistor 80 is connected to an integrate signal line 82. A comparator 84 has one input coupled to the output of amplifier 82 and the other input coupled to a voltage potential Vtrigger.

As will become apparent from the disclosure herein, the off-state gate voltage driving the reset switch 62 in all pixels is selected such that charge integration as a result of photo-electron generation will cause the voltage at the cathode of the photodiode 28 (common to the source of reset switch 62) to fall below the Vgs threshold of reset transistor 62 and begin to turn on reset switch 62 prior to overflow of electrons into the substrate. When reset switch 62 starts to conduct, it will divert excess photo-generated electrons to line 76, and thereby draw current from line 76. This current is sensed, and when it reaches a threshold level which indicates overflow from a significant number of pixels it is used to terminate the exposure interval.

Before the integration interval begins, the integrate signal on line 82 at the gate of P-Channel MOS transistor 80 is low so that the drains of all the reset switches 62a–62d in the pixels 42, 44, 46, and 48 at line 46 are held at Vref. Before the integration interval begins, the reset signal line (not shown) coupled to the gates of reset switches 32a–32d in the pixels is also on, holding the cathodes of photodiodes 58a–58d at Vref. The xfr clock at the gates of transfer switches 64a–64d is also on at this time so that the upper plates of capacitors 30a–30d are also reset to Vref.

Referring now to pixels 42, 44, 46, and 48, at the beginning of the integration interval, the reset signal goes low, isolating the cathodes of the photodiodes 58a–58d from line 76, and the integrate clock line 82 goes high. At this point, the inverting input of the amplifier 72 at line 76 is held to Vref by the capacitive feedback around amplifier 72. Also, the negative photocurrent (electrons) collected by photodiodes 58a–58d begins to integrate on both photodiodes 58a–58d and their respective storage capacitors 60a–60d, causing the voltage on capacitors 60a–60d to integrate down from the reset level Vref.

The low level of the reset clock is set to approximately 1 volt. As integration of photocurrent continues, the voltages on the source of one or more of reset switches 62a–62d will eventually decrease to approximately 1 N-Channel threshold below the voltage on their gates, at which point one or more of them will begin to turn on and further photocurrent generated in their pixels will flow through reset switches 32a–32d into line 76. Since line 76 is being held at Vref by amplifier 72, the output of amplifier 72 must move up to compensate for the injected charge Q-overflow into line 76. A difference voltage will appear at the output of amplifier 72 equal to Q-overflow divided by capacitor 78. As the excess photocurrent continues to flow through reset switch 32a, the voltage on the output of amplifier 72 will increase until it reaches the level of Vtrigger and the comparator 84 will flip, indicating that the integration interval should be terminated.

This scheme implemented by the circuit 40 of FIG. 3 assumes that the select switches 68a–68d will be off during the integration interval so that no current can flow through amplifier transistors 66a–66d. The drains of amplifier transistors 66a–66d are covered by a light shield so that no photocurrent flows through them.

Those of ordinary skill in the art will observe that capacitor 78 is integrating the overflow current from all the pixels in the array in the configuration shown. The amount of overexposure desired can be adjusted by the difference between Vtrigger and Vref, and also the size of capacitor 78. To provide a numerical example for this circuit, it is assumed that there is a highlight in the image of 1000 pixels (out of an image of about a million pixels) that it is desired to use as a reference exposure to terminate the integration. In any pixel, storage capacitor 60a and the capacitance of photodiode 58 combined add up to about 100 fF. An amount of excess photocharge corresponding to 10% of the charge capacity of a pixel would be about 100 mV×100 fF=10 fC. For 1000 pixels, this adds up to 10 pC. If Vref–Vtrigger=1V, capacitor 78 would have to be 10 pF, which could easily be integrated into the substrate containing the array.

In summary, the technique described with reference to FIG. 3 would provide exposure control for a digital still camera that is fairly simple to implement. It is well suited for integration with the storage pixel concept due to the inherent simplicity of electronic exposure control provided by the storage pixel concept.

Figure 4:
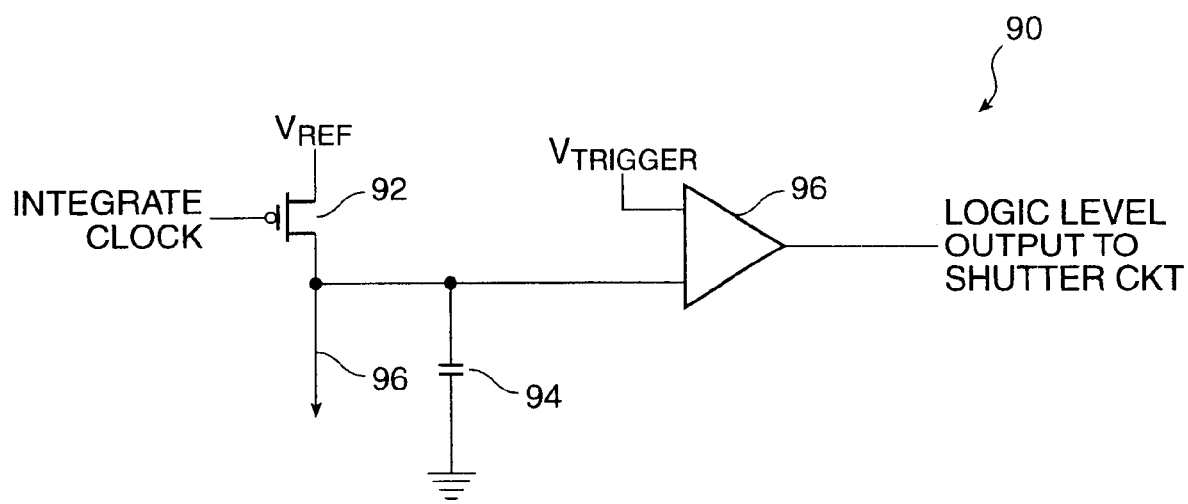
FIG. 4 is a schematic diagram of another circuit according to the present invention for providing exposure control in active pixel sensor arrays by means of overflow detection in an active-pixel array according to the present invention.

Referring now to FIG. 4, a schematic diagram of another overflow control circuit 60 employing an alternative technique for detecting overflow in CMOS active pixels according to the present invention is presented. The technique embodied in the circuit of FIG. 4 is simpler than the feedback technique of FIG. 3.

The circuit of FIG. 4 does not utilize operational amplifier 72 but instead employs P-Channel MOS transistor 92, having its source connected to Vref, its drain connected to line 76 of FIG. 3, and its gate connected to the integrate signal line 98. Capacitor 94, shown connected between line 76 and ground, may be realized as the distributed capacitance of line 76. Line 76 is also connected to one input of comparator 96. The other input to comparator 96 is connected to the voltage potential Vtrigger.

Before the integration cycle begins, the integrate signal line 98 at the gate of P-Channel MOS transistor 92 is low so that the pixels can be reset to Vref as in the embodiment of FIG. 1. P-Channel MOS transistor 92 is also turned on after the integration cycle to assure continued draining of photocurrent during readout. However, during exposure, P-Channel MOS transistor 92 is off, so that capacitor 94 alone maintains line 76 at Vref. As integration proceeds, some pixels will start to overflow, thus pulling down line 76 enough to trigger comparator 96 to indicate that the integration interval is complete.

The overflow-sensing techniques of the present invention may be extended to imagers employing a bipolar non-storage technology, where a well is biased to act as an emitter for overflow collection during exposure, as opposed to its usual bias as a collector during readout. In this case, there is not a fast electronic shutter, so the trigger can not be used to terminate the exposure precisely, but, from the within disclosure, persons of ordinary skill in the art will appreciate that it can be used to quench a strobe flash or to close a mechanical shutter, and to begin readout.

In addition, persons of ordinary skill in the art will appreciate that the overflow-sensing techniques of the present invention may be advantageously employed in prior-art imagers which measure the light either at a different time, e.g. just before the actual exposure, or with a different sensor device that needs to be calibrated relative to the sensor that is picking up the actual image, with the advantage that it senses the brightest areas rather than the average over the array.

Several of the prior art techniques allow the light measurement to be made over either a full image area (average mode) or a restricted area (spot mode). The present invention is easiest to embody in a full image mode, but with wiring changes in the array could be adapted to operate in a spot mode.

Another aspect of the present invention is the use of the reset/overflow/exposure transistors in a slightly differently timed mode to allow the capture of more highlight detail than would be possible when using it simply as an overflow transistor with or without automatic exposure termination. By combining the automatic detection of overflow with a subsequent brief extension of the exposure period during which the overflow limiting function is disabled or modified, it is possible to allow the highlight pixels that have become limited at the overflow level to differentiate themselves.

For example, while capturing an image, the automatic exposure detection of the present invention may detect that there is a significant amount of overflow after say 10 msec. At that time, perhaps about 1% of the pixels have integrated photocurrent to the limiting overflow level as determined by the gate voltage on the reset switches 62. At that time, instead of simply terminating the exposure by closing the transfer switches 64, this aspect of the present invention first reduces the gate voltage on the reset transistor switch 62, moving the limiting overflow level in the direction that allows more photocurrent to be integrated, and then waiting a brief time, say on the order of 1 msec, or 10% of the already elapsed time, or perhaps less (substantially less than the original exposure time, in general), and then terminating the exposure.

This brief extension of time then allows the very bright pixels to be differentiated, with a reduced gain in terms of Volts per Watt. Pixels that are ten (or so) times brighter than what it took to cause limiting in the original time period will still be limited, but the extension of dynamic range on the high end is still considerable.

Referring now to FIG. 5, a block diagram is presented of another circuit 100 according to the present invention for providing exposure control in active pixel sensor arrays by means of overflow detection in an active-pixel array according to the present invention and additionally for extending the dynamic range of an active pixel imager.

The exposure time register 102 holds a number indicating how many clock cycles long the exposure, or the maximum exposure, should be. The exposure time is determined by down counter 104.

If Enable Auto-Exposure input 106 is low, then the exposure time will be determined simply by the down counter 104 preloaded with the exposure time number stored in exposure time register 102. A start pulse on start line 108 loads the exposure time number into down counter 102 via multiplexer 1110, making the "=0" output of down counter 102 go low for the predetermined duration, directly driving the XFR line and being delayed by one cycle for Integrate line 112 and Reset line 114 through flip-flop 116. The duration of the exposure is set by the exposure time number multiplied by the clock cycle time on clock line 118.

If the enable auto-exposure input 106 is high, then the exposure time set into down counter 104 from exposure time register 102 is used as a maximum. If a trigger signal is never detected at the output of comparator 120, due to insufficient total light in the maximum exposure interval, then the behavior of circuit 100 is as described above for the manual exposure case.

If a trigger signal is detected representing a threshold overflow signal condition, via AND gate 122, D flip-flops 124 and 126, and OR gate 128, the down counter 104 is reloaded from the up counter 130 through multiplexer 110, because now the XFR line 112, driving the address input of multiplexer 110, is in the other state. D-flip-flop 124 and AND gate 122 serve to synchronize the trigger to the clock. The effect of this action depends on the state of the Mode input 132.

If the Mode input 132 is low, then the up counter 130 is held at zero through inverter 134 and OR gate 136, and loading the down counter with zero makes the XFR line 112 go low immediately, terminating the exposure.

If the Mode input 136 is high, then the up counter is loaded from divide-by-N unit 138, and the exposure will be extended for this many more clock cycles. The output of divide-by-N unit 138 increments by one every N input clock pulses and thus represents approximately 1/N of the already elapsed exposure period. During this extended exposure period, the overflow barrier will be raised by lowering Reset line 112 to a lower voltage (V3 instead of the usual V2).

The Reset line is controlled by P-Channel MOS transistor 140 and N-Channel MOS transistors 142, 144, 146, and 148. When the Integrate line 116 is low, P-Channel MOS transistor 140 drives Reset line 112 to a high level voltage V1. Throughout the normal integration period when trigger at the output of comparator 120 is false, N-Channel MOS transistors 142 and 144 are turned on, via the outputs of D flip-flops 116 and 126, respectively, driving Reset line 112 to a medium-low level (V2). During only the second clock cycle after Trigger becomes true and Mode input 132 is high, N-Channel MOS transistors 146 and 148 drive Reset line 112 to a lower level (V3). After that, Reset line 112 floats at that level for the remainder of the extended integration period. Alternately, Reset input 112 could be continually driven to V3 if desired. Circuit modifications to provide such a feature could trivially be made by persons of ordinary skill in the art.

Referring now to FIGS. 6a, 6b, and 6c, timing diagrams show the operation of the circuit of FIG. 5 in all three cases discussed above. All logic signals transition after the rising clock edge that leads to them.

FIG. 6a illustrates the simple countdown case, independent of the state of the Mode line 132. In this case, the trigger never occurs, either because it is disabled in order to obtain a fixed exposure time, or because the light level is so low that the maximum exposure time is reached.

FIG. 6b illustrates the simple auto-exposure case. In this case, the Mode input 132 is zero and the integration period is terminated by the trigger event.

FIG. 6c illustrates the highlight-extension auto-exposure case where the Mode input 132 is high and the trigger event causes the voltage at Reset line 112 to change, raising the overflow barrier, and causes the integration period to continue for about an additional 1/N of the already-elapsed exposure time. FIG. 6c is drawn using N=3. A typical value of N would be 5 to 20. FIGS. 6a and 6c are drawn using N=3 to save space. The total count for the Exposure Time would be many bits; with a 10 MHz clock and an absolute maximum time of 1 second, 24 bits would be required. The smallest possible count to make a dark frame with all the XFR, Integrate, and Reset edges in the right sequence would be 2 clock cycles.

Those of ordinary skill in the art will observe that, if Mode is high, and Trigger becomes high near the end of the maximum exposure count, then the total exposure with the extension might exceed the maximum count by a ratio of up to 1+1/N; this is a feature, not a bug, since it would be harder to make sense of the data if the exposure were terminated some time in the middle of the extension.

Referring now to FIGS. 7 and 8a through 8f, the operation of the circuit of FIG. 5 may be easily seen. FIG. 7 is a simplified schematic diagram of a partial pixel 160 connected to an n-type switch 168 serving the same role as transistor 92 in FIG. 4. The pixel sensor 160 of FIG. 7 includes a photodiode 162, having its anode formed in a semiconductor substrate (shown as ground symbol 164), and its cathode connected to the source of a reset transistor 166. The drain of the reset transistor 166 is connected to the source of a transistor 168, whose drain is connected to a reference voltage supply Vref (shown at reference numeral 170), and whose gate is connected to a reset control line 172. The gates of the reset transistor 166 and transistor 168 are connected to reset-A and reset-B control lines, 174, and 176, respectively. In the configuration illustrated in FIG. 7, where reset transistor 166 and transistor 168 are both N-Channel devices, the signals reset-A and reset-B could be the same signal. Persons of ordinary skill in the art will realize that it is preferable for transistor 168 to be a P-Channel device in actual embodiments fabricated according to the principles of the present invention, as in transistor 92 of FIG. 4, since a P-Channel device will have a greater drive capability. An N-Channel transistor is shown in FIG. 7 simply so that an energy diagram in terms of electrons can be used to illustrate the behavior.

FIGS. 8a through 8f are energy diagrams which illustrate the potential at different points in the circuit of FIG. 7. In each of FIGS. 8a through 8f, the substrate potential is shown at the left at reference numeral 172, the potential of the photodiode cathode is shown to its right at reference numeral 174, the potential barrier set by the reset-A 45 transistor is shown to the right of the photodiode cathode at reference numeral 176, the potential at the overflow node to the right of the potential barrier set by the reset-A transistor at reference numeral 178, the potential barrier set by transistor 168 is shown to the right of the overflow node at reference numeral 180 and the potential of the Vref supply furthest to the right at reference numeral 182. The reference numerals 172, 174, 176, 178, 180, and 182 will be followed by suffixes a through f to correspond to the figures to which reference is made. As in FIGS. 2a through 2e, the stippling and individual dots in each of the FIGS. 8a through 8f illustrates increments of charge. The height of the stippling in each region indicates the potential to which such charge has elevated each region. Those of ordinary skill in the art will recognize that charge units are electrons and thus that higher levels of charge thus represent lower voltages.

FIG. 8a illustrates the potential energy conditions which exist during the reset period when transistors 166 and 168 are turned on to reset the pixel sensor 160 to Vref. At the point in time illustrated by FIG. 8a, the potential barriers presented by transistors 166 and 168 at reference numerals 176a and 180a are low and the energy level at the cathode of the photodiode 12 at region 174a is set equal to Vref by the flow of current through transistors 166 and 168. Thus the potential at the cathode of photodiode 162 at region 174a has been set equal to the level Vref which exists at reference numeral 182a.

FIG. 8b illustrates the potential energy conditions which exist during the early portion of the integration period when transistors 166 and 168 are turned off and charge is accumulating at the cathode of photodiode 162 in region 174b. The accumulation of charge starts to raise the voltage at the cathode of photodiode 162 in region 174b because the potential barrier presented by the transistor 166 at reference numeral 176b, prevents the charge from flowing through reset transistor 166. Note that the potential energy barriers presented by reset transistors 166 and 168 are both lower than the potential of the substrate.

FIG. 8c illustrates the potential energy conditions which exist during a later portion of the integration period. Transistors 166 and 168 are still off and charge has accumulated at the cathode of photodiode 162 in region 174c to raise the potential of the photodiode cathode. The potential barrier of the reset transistor 166 at reference numeral 176c still prevents the charge from flowing through reset transistor 166.

FIG. 8d to which attention is now drawn, illustrates the potential energy conditions which exist during a later portion of the integration period when charge accumulating at the cathode of photodiode 162 in region 174d is overflowing the potential barrier of reset transistor 166 at reference numeral 176e and has begun to raise the potential at the overflow node between transistors 166 and 168 as shown at reference numeral 178d. Those of ordinary skill in the art will recognize that the overflow node is common to a group of pixels in the array which may include all pixels in the array.

FIG. 8e illustrates the potential energy conditions which exist at the point where charge accumulating at the overflow node at region 174e has caused the overflow detect to trigger. The energy conditions in FIG. 8e should be compared with those of FIG. 8f, in which the potential barrier of reset transistor 166 has been raised slightly to allow further exposure for a selected time period, such as by employing the circuit of FIG. 5. The barrier height at 180 is not critical to this description, as it only operates as an on/off switch.

According to another aspect of the present invention, dark frame subtraction can reduce fixed pattern noise due to variations between pixels significantly. Dark frame capture can easily be implemented electronically with a frame store imager simply by having a very short exposure time. This eliminates the need for a mechanical shutter to perform the dark frame generation, which will save cost and complexity of the camera.

FIG. 9 is a timing diagram showing how this principle can be implemented using the circuit of FIG. 5. If a dark frame is desired, the preset count is set to be as small as possible. In the circuit of FIG. 5, the count is set equal to 2 in order to assure that the timing edges of the signals are correct.

The transfer output waveform, the integrate signal and reset waveform of the circuit of FIG. 5 are shown in FIG. 9. Inspection of the storage pixel 12 of FIG. 3 together with the timing diagram of FIG. 9 explains the phase relationships required for of the reset and transfer signals. During the time period (t1 to t2), both reset switch 62a and transfer switch 64a are on which causes photodiode 58a and capacitor 60a to be reset at the beginning of the integration cycle. Then the reset pulse goes low (time =t2) so that integration of photocurrent can begin. During integration (t2 to t3), the transfer switch 64a stays on so that the photocharge is integrated on both capacitor 60a and photodiode 58a, to increase the charge capacity and thereby the signal-to-noise ratio of the pixel. For dark-frame capture, this integration interval is kept extremely short so that effectively zero photogenerated charge is accumulated. When the integration interval is complete, the transfer switch 64a turns off to isolate the image information on capacitor 60a from further charge integration. Soon thereafter (time=t4), the reset switch 62a turns back on, keeping the photodiode at a positive potential during readout to absorb as many of the photo generated electrons as possible to keep them from being collected on the upper plate of capacitor 60a and affecting the stored voltage level.

In summary, dark frame subtraction can reduce fixed pattern noise due to pixel variation significantly. Furthermore it is easily integrated into the storage pixel operation as described above, without the requirement of a mechanical shutter for the camera.

One of the main sources of fixed pattern noise in a CMOS imaging array comprises variations in the transistor parameters in the pixel circuit. These variations include VTN, W/L, body factor, etc. Example sources of error are source follower gain and offset variation, or transient noise injection variation. Much of this noise does not vary rapidly with time and therefore a periodic calibration can significantly reduce the effect of the noise.

Referring again to FIG. 3, an understanding is provided of a method according to the present invention for calibration of the individual pixels. Normally the pixel is reset to the Vref level before an integration cycle begins. After the pixel is reset, photocurrent generated in photodiode 58 causes the voltage on the cathode of the photodiode 58 or the upper plate of capacitor 60 to decrease, corresponding to the signal. However, if the reset switch 62 and the transfer switch 64 are clocked in rapid succession so that there is no time for photocurrent to accumulate, a reference frame can be generated that can be subtracted from the image frame at a later time when both frames have been stored on the host system.

If the level of Vref is varied, and the reference frame regenerated, the entire transfer function over the whole dynamic range from the cathode of photodiode 58 to the analog output can be reconstructed separately for every pixel in the array. This operation will generate a lot of data and therefore cannot be done frequently, however an overnight or "between rolls" calibration might make sense.

This type of calibration can be used to reduce noise levels down to the sources of noise that vary over time, such as 1/f noise and thermal noise. However, time varying noise occurs at the 10 bit level or below, and so is less significant for commercial imagers.

FIGS. 10a through 10d are energy diagrams illustrating the dark frame calibration feature of the present invention. FIGS. 10a through 10d refer to the energy levels associated with the simplified pixel of FIG. 7. In FIGS. 10a through 10f, the substrate potential is shown at the left at reference numeral 192, the potential of the photodiode cathode is shown to its right at reference numeral 194, the potential barrier set by the reset-A transistor 166 is shown to the right of the photodiode cathode at reference numeral 196, the potential at the overflow node to the right of the potential barrier set by the reset-A transistor at reference numeral 198, the potential barrier set by the reset-B transistor 168 is shown to the right of the overflow node at reference numeral 200 and the potential of the Vref supply furthest to the right at reference numeral 202. The reference numerals 192, 194, 196, 198, 200, and 202 will be followed by suffixes a through d to correspond to the figures to which reference is made.

FIG. 10a shows the energy levels present in the pixel of FIG. 7 when resetting the pixel to dark level. The potential barriers of transistors 166 and 168 at reference numerals 196a and 200a are low, allowing the energy levels of the photodiode cathode at reference numeral 194a, the overflow node at reference numeral 198a to equalize at the potential Vref at reference numeral 202a.

Next, as shown in FIG. 10b, the potential barriers of transistors 166 and 168 are raised, as shown at reference numerals 196b and 200b. No photo integration has taken place and the dark-frame charge level is read out of the pixels at this point. In the case of a storage pixel, the XFR switch is turned off prior to readout.

As shown, in FIG. 10c, the potential barriers of reset transistors 166 and 168 at reference numerals 196c and 200c are lowered again to reset to the gray level, allowing the energy levels of the photodiode cathode at reference numeral 194c, the overflow node at reference numeral 198c to again equalize at the potential Vref at reference numeral 202c.

Finally, as shown in FIG. 10d, the potential barriers of transistors 166 and 168 at reference numerals 196d and 200d are again raised. No photointegration has yet taken place, and a uniform gray-level image based on the lowered Vref voltage is now read out.

While embodiments and applications of this invention have been shown and described, it would be apparent to those skilled in the art that many more modifications than mentioned above are possible without departing from the inventive concepts herein. In particular, such skilled persons will recognize that the n-type and p-type regions could be reversed along with the cathodes and anodes of the photodiodes, and the polarities of all voltages, resulting in an operative embodiment. The invention, therefore, is not to be restricted except in the spirit of the appended claims.

What is claimed is:

1. A method for controlling the exposure of a two-dimensional array of active pixel sensors disposed on a semiconductor substrate, comprising the steps of:
   integrating photocurrent in each pixel sensor in the two-dimensional array during an integration time period;
   collecting overflow charge from all pixel sensors in said two-dimensional array during said integration time period;
   developing an overflow signal as a function of said overflow charge; and
   terminating said integration time period when said overflow signal exceeds a preset threshold level selected to represent a desired reference exposure level.

2. The method of claim 1 wherein the step of collecting overflow charge from all pixel sensors in said two-dimensional array comprises setting a charge potential barrier at a charge collection electrode of a photodiode in each pixel sensor, said potential barrier being lower than the potential at which charge would overflow into the substrate, and collecting charge overflowing said potential barrier.

3. The method of claim 2 wherein the step of developing an overflow signal comprises developing a voltage proportional to said charge having overflowed said potential barrier.

4. A method for controlling the exposure of a two-dimensional array of active pixel sensors disposed on a semiconductor substrate, comprising the steps of:
   resetting each pixel sensor in said two-dimensional array during a reset time period;
   integrating photocurrent in each pixel sensor in said two-dimensional array during an integration time period;
   collecting overflow charge from all pixel sensors in said two-dimensional array during said integration time period;
   developing an overflow signal as a function of said overflow charge; and
   terminating said integration time period when said overflow signal exceeds a preset threshold level.

5. The method of claim 4 wherein the step of collecting overflow charge from all pixel sensors in said two-dimensional array comprises setting a charge potential barrier at a charge collection electrode of a photodiode in each pixel sensor, said potential barrier being lower than the potential at which charge would overflow into the substrate, and collecting charge overflowing said potential barrier.

6. The method of claim 5 wherein the step of developing an overflow signal comprises developing a voltage proportional to said charge having overflowed said potential barrier.

7. Apparatus for controlling the exposure of a two-dimensional array of active pixel sensors, comprising:
   means for integrating photocurrent in each pixel sensor in the two-dimensional array during an integration time period;
   means for collecting overflow charge from all pixels in said two-dimensional array during said integration time period;
   means for developing an overflow signal as a function of said overflow charge; and
   means for terminating said integration time period when said overflow signal exceeds a preset threshold level.

8. The apparatus of claim 7 wherein the means for collecting overflow charge from all pixel sensors in said two-dimensional array comprises means for setting a charge potential barrier at a charge collection electrode of a photodiode in each pixel sensor, said potential barrier being lower than the potential at which charge would overflow into the substrate, and for collecting charge overflowing said potential barrier.

9. The apparatus of claim 8 wherein the means for developing an overflow signal comprises means for developing a voltage proportional to said charge having overflowed said potential barrier.

10. In a two-dimensional active pixel imager array including pixel sensors each comprising a photodiode having a first terminal connected to a fixed potential, a second terminal connectable to a reference voltage source through a reset transistor having a gate, a source connected to the second terminal and a drain connected to the reference voltage source, a storage capacitor connectable to the second terminal through a transfer switch, an amplifier having an input coupled to the capacitor and an output coupled to an output line through a select switch, a method for controlling the exposure of the two-dimensional active pixel array, comprising the steps of:
   turning on the reset transistor and the transfer switch of each pixel sensor in said two-dimensional active pixel sensor array to reset each pixel sensor during a reset time period, said reset transistor turned on by applying a first voltage to its gate;
   turning off the reset transistor while leaving the transfer switch on in each pixel to integrate photocurrent in each pixel sensor during an integration time period, said reset transistor in each pixel sensor turned off by applying a second voltage to its gate, said second voltage selected to bias said reset transistor in each pixel off until voltage at the second terminal of the photodiode in individual pixel sensors decreases by a set amount enough to pass charge through each pixel sensor's reset transistor during said integration time period;
   deriving an overflow signal proportional to the total charge drawn from said reference voltage source during said integration period; and
   terminating said second time period when said overflow signal exceeds a preset threshold level selected to represent a desired reference exposure level.

11. A method for controlling the exposure of a two-dimensional array of active pixel sensors each including an amplifier and disposed on a semiconductor substrate, comprising the steps of:
   integrating photocurrent in each pixel sensor in the two-dimensional active pixel array during an integration time period;
   collecting overflow charge from all pixel sensors in the two-dimensional active pixel array during said integration time period;
   developing an overflow signal as a function of said overflow charge; and
   terminating said integration time period when said overflow signal exceeds a preset threshold level selected to represent a desired reference exposure level.

12. The method of claim 11 wherein the step of collecting overflow charge from all pixel sensors in said two-dimensional array of active pixel sensors comprises setting a charge potential barrier at a charge collection electrode of a photodiode in each pixel sensor, said potential barrier being lower than the potential at which charge would overflow into the substrate, and collecting charge overflowing said potential barrier.

13. The method of claim 12 wherein the step of developing an overflow signal comprises developing a voltage proportional to said charge having overflowed said potential barrier.

14. A method for controlling the exposure of a two-dimensional array of active pixel sensors each including an amplifier and disposed on a semiconductor substrate, comprising the steps of:

resetting each pixel sensor in the two-dimensional active pixel array during a reset time period;

integrating photocurrent in each pixel sensor in the two-dimensional active pixel array during an integration time period;

collecting overflow charge from all pixel sensors in the array during said integration time period;

developing an overflow signal as a function of said overflow charge; and terminating said integration time period when said overflow signal exceeds a preset threshold level.

15. The method of claim 14 wherein the step of collecting overflow charge from all pixel sensors in said two-dimensional active pixel array comprises setting a charge potential barrier at a charge collection electrode of a photodiode in each pixel, said potential barrier being lower than the potential at which charge would overflow into the substrate, and collecting charge overflowing said potential barrier.

16. The method of claim 15 wherein the step of developing an overflow signal comprises developing a voltage proportional to said charge having overflowed said potential barrier.

17. Apparatus for controlling the exposure of a two-dimensional array of active pixel sensors each including an amplifier, comprising:

means for integrating photocurrent in each pixel sensor in the two-dimensional active pixel array during an integration time period;

means for collecting overflow charge from all pixel sensors in the two-dimensional active pixel array during said integration time period;

means for developing an overflow signal as a function of said overflow charge; and means for terminating said integration time period when said overflow signal exceeds a preset threshold level.

18. The apparatus of claim 17 wherein the means for collecting overflow charge from all pixel sensors in said two-dimensional active pixel array comprises means for setting a charge potential barrier at a charge collection electrode of a photodiode in each pixel sensor, said potential barrier being lower than the potential at which charge would overflow into the substrate, and for collecting charge overflowing said potential barrier.

19. The apparatus of claim 18 wherein the means for developing an overflow signal comprises means for developing a voltage proportional to said charge having overflowed said potential barrier.

20. In a two-dimensional active pixel imager array including pixel sensors each comprising a photodiode having a first terminal connected to a fixed potential, a second terminal connectable to a reference voltage source through a reset transistor having a gate, a source connected to the second terminal and a drain connected to the reference voltage source, a storage capacitor connectable to the second terminal through a transfer switch, an amplifier having an input coupled to the capacitor and an output coupled to an output line through a select switch, a method for controlling the exposure of the two-dimensional active pixel array, comprising the steps of:

turning on the reset transistor and the transfer switch of each pixel sensor in the two-dimensional active pixel array to reset each pixel in the two-dimensional active pixel array during a reset time period, said reset transistor turned on by applying a first voltage to its gate;

turning off the reset transistor while leaving the transfer switch on in each pixel sensor in the two-dimensional active pixel array to integrate photocurrent in each pixel during an integration time period, said reset transistor in each pixel turned off by applying a second voltage to its gate, said second voltage selected to bias said reset transistor in each pixel sensor in the two-dimensional active pixel array off until voltage at the second terminal of the photodiode in individual pixels decreases by a set amount enough to pass charge through the pixel sensor's reset transistor during said integration time period;

deriving an overflow signal proportional to the total charge drawn from said reference voltage source during said integration period; and terminating said second time period when said overflow signal exceeds a preset threshold level selected to represent a desired reference exposure level.

* * * * *